United States Patent [19]

Haapanen

[11] Patent Number: 5,436,936
[45] Date of Patent: Jul. 25, 1995

[54] COMPENSATION OF A CLOCK OPERATING ERROR

[75] Inventor: Sakari Haapanen, Espoo, Finland

[73] Assignee: Tecnomen Oy, Espoo, Finland

[21] Appl. No.: 979,872

[22] PCT Filed: Aug. 14, 1991

[86] PCT No.: PCT/FI91/00254

§ 371 Date: Apr. 5, 1993

§ 102(e) Date: Apr. 5, 1993

[87] PCT Pub. No.: WO92/03880

PCT Pub. Date: Mar. 5, 1992

[30] Foreign Application Priority Data

Aug. 14, 1990 [FI] Finland .................................. 904013

[51] Int. Cl.$^6$ ........................ H04L 7/00; H04L 25/36; H04L 25/40
[52] U.S. Cl. .................... 375/371; 340/825.2; 375/368
[58] Field of Search ............... 375/118, 116, 117, 110; 340/825.2

[56] References Cited

U.S. PATENT DOCUMENTS

| | | | |
|---|---|---|---|
| 4,404,675 | 9/1983 | Karchevski | 371/47 |
| 4,843,617 | 6/1989 | Marshall et al. | 375/118 |
| 5,008,904 | 4/1991 | Mangelsdorf et al. | 375/118 |

FOREIGN PATENT DOCUMENTS

| | | |
|---|---|---|
| 0350149 | 1/1990 | European Pat. Off. |
| 891897 | 10/1989 | Finland |
| WO90/07147 | 6/1990 | WIPO |

*Primary Examiner*—Stephen Chin
*Assistant Examiner*—Bryan Webster
*Attorney, Agent, or Firm*—Robert P. Simpson; Michael L. Dunn

[57] ABSTRACT

A method for compensating a clock's operating error, the method comprising the steps of: producing a clock frequency (f2) from a frequency (f1) of a high-frequency oscillator by dividing it with a constant (K) and; at predetermined times synchronizing the clock to an external reference frequency, characterized in that during the course of clock synchronization, there is measured a clock operating deviation, which is created during a period defined to be a synchronizing interval, by comparing the phase of the clock to that of the reference frequency and, during the synchronizing interval, i.e., the interval between synchronization steps, the oscillator frequency (f1) is adjusted by means of a controlled variable, such as voltage, based on the measurement of an oscillator operating error, in a manner that the effect of the oscillator operating error on the clock frequency is minimized.

2 Claims, 1 Drawing Sheet

---

PRODUCING FREQUENCY (f1) WITH A HIGH FREQUENCY OSCILLATOR

↓

PRODUCING A CLOCK FREQUENCY (f2) BY DIVIDING (f1) WITH A CONSTANT (K)

↓

MEASURING A CLOCK OPERATING DEVIATION DURING A SYNCHRONIZATION INTERVAL BY COMPARING THE PHASE OF THE CLOCK TO A REFERENCE FREQUENCY

↓

CALCULATING A CORRECTION INTERVAL (Tk) ON THE BASIS OF THE MEASURED CLOCK OPERATING DEVIATION CREATED DURING THE SYNCHRONIZATION INTERVAL

↓

SHIFTING THE CLOCK PHASE BY DIVIDING THE CONSTANT (K) BY ONE LOWER OR ONE HIGHER (f1) FOR THE DURATION OF A SINGLE CYCLE OF A TRANSMISSION CLOCK (K/f1) AT CORRECTION INTERVALS (Tk) TO SYNCHRONIZE THE CLOCK TO THE EXTERNAL REFERENCE FREQUENCY

```
┌─────────────────────────────────────────────┐
│   PRODUCING FREQUENCY (f1) WITH A           │
│   HIGH FREQUENCY OSCILLATOR                 │
└─────────────────────────────────────────────┘
                      ↓
┌─────────────────────────────────────────────┐
│   PRODUCING A CLOCK FREQUENCY (f2) BY       │
│   DIVIDING (f1) WITH A CONSTANT (K)         │
└─────────────────────────────────────────────┘
                      ↓
┌─────────────────────────────────────────────┐
│  MEASURING A CLOCK OPERATING DEVIATION DURING A │
│  SYNCHRONIZATION INTERVAL BY COMPARING THE PHASE │
│  OF THE CLOCK TO A REFERENCE FREQUENCY      │
└─────────────────────────────────────────────┘
                      ↓
┌─────────────────────────────────────────────┐
│   CALCULATING A CORRECTION INTERVAL (Tk) ON THE │
│   BASIS OF THE MEASURED CLOCK               │
│   OPERATING DEVIATION CREATED DURING THE    │
│   SYNCHRONIZATION INTERVAL                  │
└─────────────────────────────────────────────┘
                      ↓
┌─────────────────────────────────────────────┐
│   SHIFTING THE CLOCK PHASE BY DIVIDING      │
│   THE CONSTANT (K) BY ONE LOWER OR ONE      │
│   HIGHER (f1) FOR THE DURATION OF A         │
│   SINGLE CYCLE OF A TRANSMISSION CLOCK (K/f1) │
│   AT CORRECTION INTERVALS (Tk) TO           │
│   SYNCHRONIZE THE CLOCK TO THE EXTERNAL     │
│   REFERENCE FREQUENCY                       │
└─────────────────────────────────────────────┘
```

COMPENSATION OF A CLOCK OPERATING ERROR

BACKGROUND OF THE INVENTION

The present invention relates to a method for compensating an operating error of a clock, particularly that of transmission clocks used in the base stations of a long-range paging system.

A problem in long-range paging systems with a dense network of base stations is that a paging receiver may be located within the audible range of two transmitters. Since transmitters operate on the same frequency, they interfere with each other unless synchronized.

Synchronization means that the transmission clocks of base stations send out the same information at exactly the same instant, so-called quasi synchronous transmission. In long-range paging systems with digital information, this means that the same information symbol is transmitted from various base stations at exactly the same time. Transmission is quasi synchronous if the phase difference of symbols transmitted by various base stations, upon the arrival thereof in a paging receiver, does not exceed ¼ of the time required by transmission of the symbol.

As transmission speed increases, the requirement for synchronization will be stricter since the duration of a symbol becomes shorter.

Especially in the novel long-range paging system according to ERMES standard there is a set requirement that no more than ±5 microseconds difference can be accepted in various base stations at the commencement of symbol modulation.

In order to attain a synchronization accuracy of five microseconds, a base station must necessarily be provided with a high-precision time reference (atomic clock), which is synchronized to a certain time reference, or with continous reception of time from a high-precision time reference. A drawback with both of these is a high price. High-precision time references are expensive and, on the other hand, the attainment of a necessary degree of precision would require the use of a satellite receiver and those are also expensive.

A preferred solution, durrently used for synchronization, is to provide a base station with a quartz oscillator as time reference and to synchronize the clocks of various base stations periodically to each other by using a radio path for the transmission of a synchronization signal. A problem here is, however, that during the course of synchronization the transmission of pagings is prevented. Synchronization takes about a minute. The synchronizing accuracy of ±5 microseconds would require synchronization at least at five-minute intervals due to the insufficient accuracy of a quartz oscillator. However, such a frequent synchronization takes up too much radio capacity to be practical.

BRIEF DESCRIPTION OF THE DRAWING

The drawing shows a flow chart illustrating the method of the invention.

SUMMARY OF THE INVENTION

An object of the invention is to solve this problem by compensating a clock operating error in a manner that the synchronizing interval can be substantially lengthened.

This object is achieved on the basis of the characterizing features set forth in the annexed claims.

A solution of the invention will now be described in more detail.

DESCRIPTION OF THE PREFERRED EMBODIMENT

A clock frequency f2 of a base station is obtained from a frequency f1 of a high-frequency quartz oscillator by dividing it by a constant K.

Thus, the frequency deviation of a quartz oscillator causes in the transmission clock a phase shift, which increases continuously over a synchronizing interval and drops back to zero after synchronization. Since the maximum acceptable phase shift is constant, the accuracy of a quartz oscillator defines a necessary synchronizing interval.

The frequency deviation of a quartz oscillator is a result of the following factors: environmental conditions, particularly temperature, aging, a setting error and short-term instability.

The most significant of these factors are environmental conditions, aging and setting error. The short-term instability is several times better compared to those. All three significant error factors remain constant (setting error) or change slowly (environmental factors and aging). This renders possible the compensation of these factors and a categorical improvement of the characteristics of a quartz oscillator.

The compensation is effected in a manner that, during synchronization, the oscillator operating error is measured and, during a synchronizing interval, the oscillator is adjusted so as to minimize the effect of an operating error on the transmission clock.

The compensation can be performed in two ways. One way is to adjust the frequency of an oscillator by some controlled variable, for example voltage. The other way is to shift the phase of a base station clock gradually over a synchronizing interval.

Adjustment of the frequency of an oscillator with a controlled variable produces a retroactive control circuit, wherein the controlled variable is the frequency of an oscillator. The real frequency of an oscillator is measured during synchronization and the controlled variable is used to correct the frequency of an oscillator. The control circuit is slow since synchronization is effected at intervals of about 30 minutes to measure the present frequency rate. The best control algorithm for adjusting the frequency would be purely integrating control.

Another method is a phase shift of the base station clock over a synchronizing interval. This can be effected by way of a program.

The unit of a clock phase shift is 1/f1. The phase shift is effected in including in the divider of formula f1/K for the duration of one cycle of a clock either one too high or too low a dividing constant K±1, depending on the direction of a required correction.

The correction can be effected as follows:

1. Measuring a clock operating deviation, which is created during a period equal to the synchronizing interval.
2. Calculating the real deviation by adding to the measured deviation a clock phase shift effected during the synchronizing interval.

$t1$ = measured deviation
   $t2$ = correction made during synchronizing interval
   $t3$ = real deviation t1 is understood to have a positive sign if the base station clock had been fast relative to reference time and a negative sign if it had been slow. Correction f2 is positive if the base station clock has been made slower and negative if the clock has been made faster over a synchronizing interval.

$$t3 = t1 + t2$$

3. Calculating a deviation per unit time t4.
   Ts = synchronizing interval
   $$t4 = t3/Ts$$
4. Calculating a necessary correction period Tk.

$$Tk = 1/\uparrow(t2*f1)\uparrow$$

5. Correcting the transmission clock phase at Tk intervals by varying a dividing constant K of the divider for the duration of a single period by one to be either lower or higher. If t4 were negative, the constant is subtracted by one, and if positive, the constant is increased by one.

Thus, the variation ±1 of dividing constant K produces a correction in the phase of a clock equal to phase shift unit 1/f1, and correction period Tk determines how often this correction is made during a synchronizing interval. By way of an example it can be appreciated that the oscillator can have a frequency of 4 MHz and constant K can be in the order of 1000.

I claim:

1. A method for compensating a clock's operating error, said method comprising the steps of: producing a clock frequency (f2) from a frequency (f1) of a high-frequency oscillator by dividing it with a constant (K) and; at predetermined times synchronizing said clock to an external reference frequency by altering the dividing constant (K), characterized in that during the course of clock synchronization, there is measured a clock operating deviation, which is created during a period defined to be a synchronizing interval, by comparing the phase of the clock to that of said reference frequency and on the basis of the phase comparison the clock phase is shifted by varying said dividing constant (K) by one lower or higher (1) for the duration of a single cycle of a transmission clock (K/f1) at certain correction intervals (Tk), said correction interval (Tk) being calculated on the basis of the measured clock operating deviation created during the synchronizing interval.

2. The application of a method as set forth in claim 1, characterized in that the method is applied to effect the compensation of transmission clocks in the base stations of a radio transmitter network, the transmission clocks of base stations being synchronized at certain intervals either to each other or to a common time reference and said compensation of an operating error is effected during a synchronizing interval.

* * * * *

UNITED STATES PATENT AND TRADEMARK OFFICE
CERTIFICATE OF CORRECTION

PATENT NO. : 5,436,936

DATED : July 25, 1995

INVENTOR(S) : Sakari Haapanen

It is certified that error appears in the above-indentified patent and that said Letters Patent is hereby corrected as shown below:

Column 4, Claim 1, line 14, after "higher (" insert -- ± --.

Signed and Sealed this

Thirty-first Day of October 1995

Attest:

BRUCE LEHMAN

Attesting Officer     Commissioner of Patents and Trademarks